US012150214B2

(12) United States Patent
Pocha et al.

(10) Patent No.: US 12,150,214 B2
(45) Date of Patent: *Nov. 19, 2024

(54) SYSTEMS AND METHODS FOR INTEGRATING A BROADBAND NETWORK GATEWAY INTO A 5G NETWORK

(71) Applicant: Cisco Technology, Inc., San Jose, CA (US)

(72) Inventors: Raghunadha Reddy Pocha, Bengaluru (IN); Sateesh Reddy Mommidi, Bengaluru (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,824

(22) Filed: Aug. 28, 2023

(65) Prior Publication Data

US 2023/0403762 A1 Dec. 14, 2023

Related U.S. Application Data

(63) Continuation of application No. 17/645,073, filed on Dec. 20, 2021, now Pat. No. 11,765,790, which is a
(Continued)

(51) Int. Cl.
*H04W 88/16* (2009.01)
*H04W 28/02* (2009.01)
(Continued)

(52) U.S. Cl.
CPC ....... *H04W 88/16* (2013.01); *H04W 28/0268* (2013.01); *H04W 28/24* (2013.01);
(Continued)

(58) Field of Classification Search
CPC . H04W 88/16; H04W 28/0268; H04W 28/24; H04W 40/24; H04W 48/18;
(Continued)

(56) References Cited

U.S. PATENT DOCUMENTS 7,965,635 B1 6/2011 Regan et al.
9,089,003 B2 7/2015 Karaoguz et al.
(Continued)

FOREIGN PATENT DOCUMENTS

| EP | 2632082 A2 * | 8/2013 | ......... H04L 12/2876 |
| WO | 2014060589 A1 | 4/2014 | |
| WO | 2019193469 A1 | 10/2019 | |

OTHER PUBLICATIONS

3GPP: "3rd Generation Partnership Project; Technical Specification Group Services and System Aspects; 3GPP System-Fixed Broadband Access Network Interworking; Stage 2 (Release 15)," 3GPP TS 23.139 V15.0.0, Jun. 2018, 88 Pages.
(Continued)

*Primary Examiner* — Mewale A Ambaye
(74) *Attorney, Agent, or Firm* — Baker Botts L.L.P.

(57) ABSTRACT

In one embodiment, a method includes configuring a router to act as a BNG and establishing, by the router, a connection between CPE and the BNG. The method also includes receiving, by the router, end-user and access parameters and communicating, by the router, the end-user and access parameters to one or more 5G NFs by interacting with one or more SBIs. The method further includes allowing, by the router, the CPE access to the one or more 5G NFs in response to communicating the end-user and access parameters to the one or more 5G NFs.

20 Claims, 4 Drawing Sheets

Related U.S. Application Data continuation of application No. 16/719,355, filed on Dec. 18, 2019, now Pat. No. 11,206,715.

(51) Int. Cl.
| | |
|---|---|
| *H04W 28/24* | (2009.01) |
| *H04W 40/24* | (2009.01) |
| *H04W 48/18* | (2009.01) |
| *H04W 80/08* | (2009.01) |
| *H04W 88/18* | (2009.01) |
| *H04L 45/50* | (2022.01) |

(52) U.S. Cl.
CPC ........... *H04W 40/24* (2013.01); *H04W 48/18* (2013.01); *H04W 80/08* (2013.01); *H04W 88/18* (2013.01); *H04L 45/50* (2013.01)

(58) Field of Classification Search
CPC ..... H04W 80/08; H04W 88/18; H04W 28/00; H04W 28/10; H04W 28/16; H04W 40/00; H04W 48/00; H04W 24/00; H04L 45/50; H04L 47/18; H04L 12/5691
See application file for complete search history.

(56) References Cited

U.S. PATENT DOCUMENTS

| | | | |
|---|---|---|---|
| 10,498,611 B1* | 12/2019 | Kloberdans | H04L 41/40 |
| 2010/0135297 A1 | 6/2010 | Brousard et al. | |
| 2013/0091254 A1 | 4/2013 | Haddad et al. | |
| 2017/0366328 A1 | 12/2017 | Seo et al. | |
| 2019/0052580 A1* | 2/2019 | Peng | H04L 47/825 |
| 2019/0124491 A1 | 4/2019 | Lim et al. | |
| 2019/0313275 A1 | 10/2019 | Chen | |
| 2019/0364562 A1 | 11/2019 | Chae et al. | |
| 2020/0176847 A1* | 6/2020 | Rappaport | H01P 3/122 |
| 2020/0177239 A1* | 6/2020 | Henry | H04B 3/56 |
| 2021/0195689 A1 | 6/2021 | Pocha et al. | |
| 2023/0155923 A1* | 5/2023 | Soryal | H04W 40/20 370/228 |
| 2023/0344727 A1* | 10/2023 | Burdin | H04L 45/76 |
| 2023/0371097 A1* | 11/2023 | Moore | H04W 76/15 |

OTHER PUBLICATIONS

3GPP, "3rd Generation Partnership Project; Technical Specification Group Services and System Aspects; System Architecture for the 5G System (5GS); Stage 2 (Release 16)," 3GPP TS 23.501 V16.2.0 (Sep. 2019), Sep. 2019, 391 pages.

International Search Report and Written Opinion for International Application No. PCT/US2020/062632, mailed Mar. 12, 2021, 15 Pages.

* cited by examiner

SYSTEMS AND METHODS FOR INTEGRATING A BROADBAND NETWORK GATEWAY INTO A 5G NETWORK

CROSS-REFERENCE TO RELATED APPLICATIONS

This application is a continuation of U.S. patent application Ser. No. 17/645,073 filed on Dec. 20, 2021, which is a continuation of U.S. patent application Ser. No. 16/719,355 filed on Dec. 18, 2019 by Raghunadha Reddy Pocha et al. and entitled "SYSTEMS AND METHODS FOR INTEGRATING A BROADBAND NETWORK GATEWAY INTO A 5G NETWORK", which are hereby incorporated by reference in their entireties.

TECHNICAL FIELD

This disclosure generally relates to integrating a Broadband Network Gateway (BNG) into a network, and more specifically to systems and methods for integrating the BNG into a fifth generation wireless (5G) network.

BACKGROUND

A BNG serves as an access point for subscribers to connect to a network. For example, users may connect to customer premise equipment (CPE), which communicates through the BNG to the network. 5G systems implement a number of network functions (NFs) that provide a variety of functionality.

DESCRIPTION OF EXAMPLE EMBODIMENTS

Overview

Figure 1:
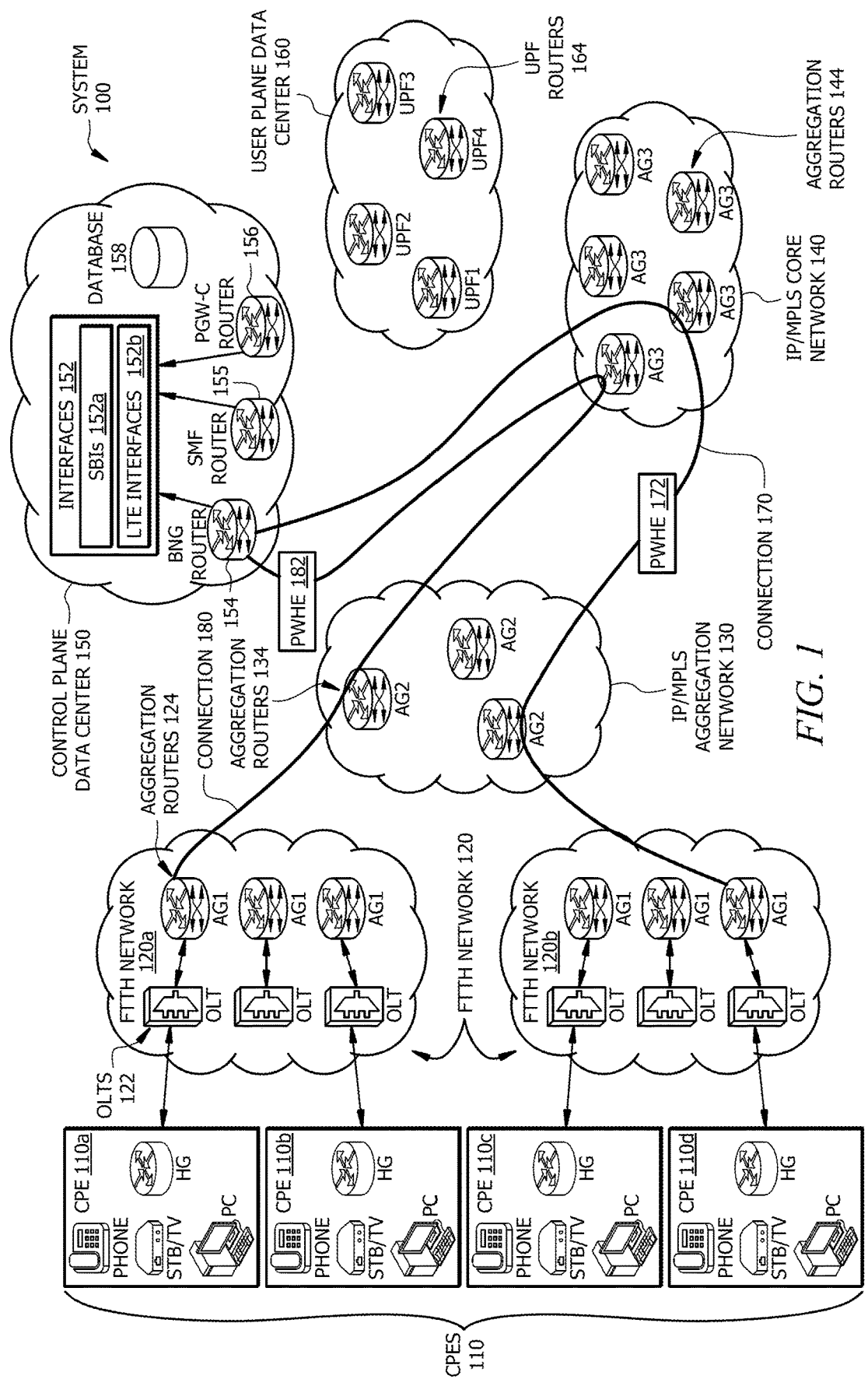
FIG. 1 illustrates an example system for integrating a BNG into a 5G network using Service Based Interfaces (SBIs)

According to an embodiment, a router includes one or more processors and one or more computer-readable non-transitory storage media coupled to the one or more processors. The one or more computer-readable non-transitory storage media include instructions that, when executed by the one or more processors, cause the router to perform operations including configuring the router to act as a BNG and establishing a connection between CPE and the BNG. The operations also include receiving end-user and access parameters and communicating the end-user and access parameters to one or more 5G NFs by interacting with one or more SBIs. The operations further include allowing the CPE access to the one or more NFs in response to communicating the end-user and access parameters to the one or more NFs.

In certain embodiments, the operations further include using Pseudowire Headend (PWHE) to expose end-user Layer 2 (L2) connectivity to the BNG. In some embodiments, the operations may further include programming Quality of Service (QoS) flows using packet forwarding control protocol (PFCP). The one or more 5G NFs may include one or more of the following NFs: Network Slice Selection Function (NSSF); Network Repository Function (NRF); Policy Control Function (PCF); Charging Function (CHF); and Authentication Server Function (AUSF). The end-user parameters may include end-user identifications and the access parameters may include remote IDs and/or circuit IDs. In some embodiments, the router is located in a control plane data center, and the control plane data center is segregated from a user plane data center. In some embodiments, the router is located between a digital subscriber line access multiplexer (DSLAM) and a Non-3GPP Interworking Function (N3IWF), the router communicates with the N3IWF via an Internet Protocol Security (IPSec) tunnel, and the router interacts with the one or more SBIs via the N3IWF.

According to another embodiment, a method includes configuring a router to act as a BNG and establishing, by the router, a connection between CPE and the BNG. The method also includes receiving, by the router, end-user and access parameters and communicating, by the router, the end-user and access parameters to one or more 5G NFs by interacting with one or more SBIs. The method further includes allowing, by the router, the CPE access to the one or more 5G NFs in response to communicating the end-user and access parameters to the one or more 5G NFs.

According to yet another embodiment, one or more computer-readable non-transitory storage media embody instructions that, when executed by a processor, cause the processor to perform operations including configuring the router to act as a BNG and establishing a connection between CPE and the BNG. The operations also include receiving end-user and access parameters and communicating the end-user and access parameters to one or more 5G NFs by interacting with one or more SBIs. The operations further include allowing the CPE access to the one or more 5G NFs in response to communicating the end-user and access parameters to the one or more 5G NFs.

Technical advantages of certain embodiments of this disclosure may include one or more of the following. Certain systems and methods described herein integrate a BNG into the 5G network to allow end-users access to one or more 5G NF services. The 5G NF services may classify, enforce, and/or apply various policies and billing systems based on access-technology. The 5G cloud architecture may utilize network-as-a-service (NaaS) with unified subscriber management to allow end-users access to these 5G NF services.

In certain embodiments, an access aggregation network is located close to CPE/DSLAM devices to accommodate the throughput requirements requested by the end-user (e.g., Internet Protocol television (IPTV), gaming, high-speed broadband (more than 1 gigabits per second), etc.). In some embodiments, the 5G cloud-based architecture includes a centralized control plane that is created by slicing the NFs based on end-user parameters and access-parameters, which may support higher bandwidth requirements. The centralized control plane may be easier to maintain than traditional control planes and may be scaled according to load requirements. The edge user plane may be located close to the access network, which may accommodate higher bandwidth and speed than traditional systems. The edge user plane also provides flexibility to break out required flows locally and forward certain flows to 5G networks and Evolved Packet Core (EPC). In certain embodiments, the end-user may be connected from any fixed wireless access so that the respective BNG can retrieve the user profile based on user identity parameters.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for integrating a BNG into a 5G network. A BNG is an access point for subscribers to connect to a broadband network. When a connection is established between the BNG and CPE, the subscriber can access the broadband services. The broadband services may be provided by a network service provider (NSP) or an Internet service provider (ISP). The control architecture for a 5G network is capable of supporting the integration of a ubiquitous access continuum composed of millions of fixed and heterogeneous wireless resources. 5G networks can accommodate different deployments (e.g., traditional broadband deployments, on-site tailor-made industrial application deployments, etc.) having multiple accesses in different environments.

Third Generation Partnership Project (3GPP) 5G systems of Service Based Architecture (SBA) have defined Network Functions (NFs) with SBIs to support a cloud infrastructure. The cloud infrastructure is supported by segregating control-plane and user-plane functionality. The 5G systems have defined processes for network selection, identification, authentication, authorization, access control, barring, mobility, Evolved Packet System (EPS) fallback, policy control, and lawful interception for the end-user based on Subscription Permanent Identifier (SUPI), Permanent Equipment Identifier (PEI), Public Land Mobile Network (PLMN), slice information (e.g., Network Slice Selection Assistance Information (NSSAI)), and the like. However, there are no processes to interoperate with broadband users of wireline/fixed-wireless deployments since the broadband users can use any kind of access technologies to utilize the services.

Figure 2:
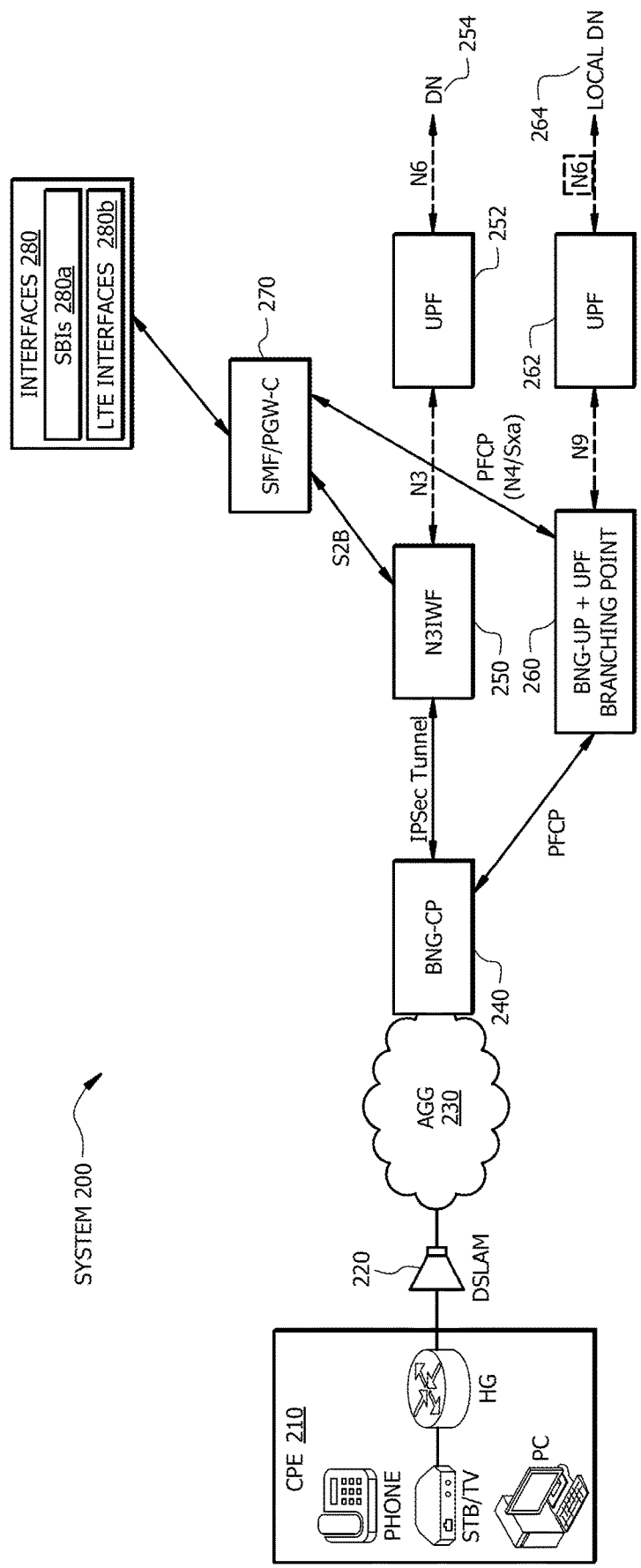
FIG. 2 illustrates an example system for integrating a BNG into a 5G network using a Non-3GPP Interworking Function (N3IWF)
Figure 3:
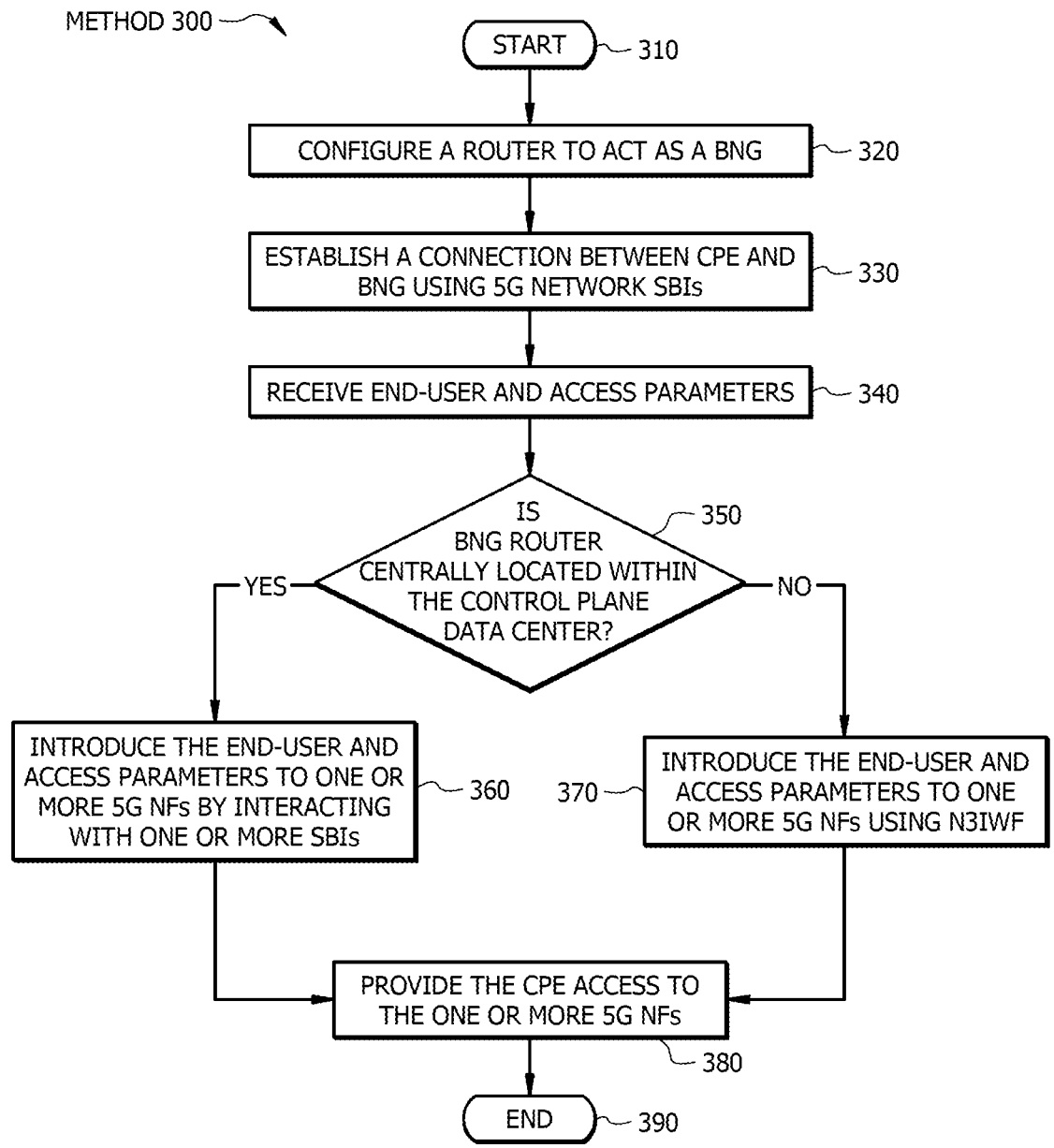
FIG. 3 illustrates an example method for integrating a BNG into a 5G network.
Figure 4:
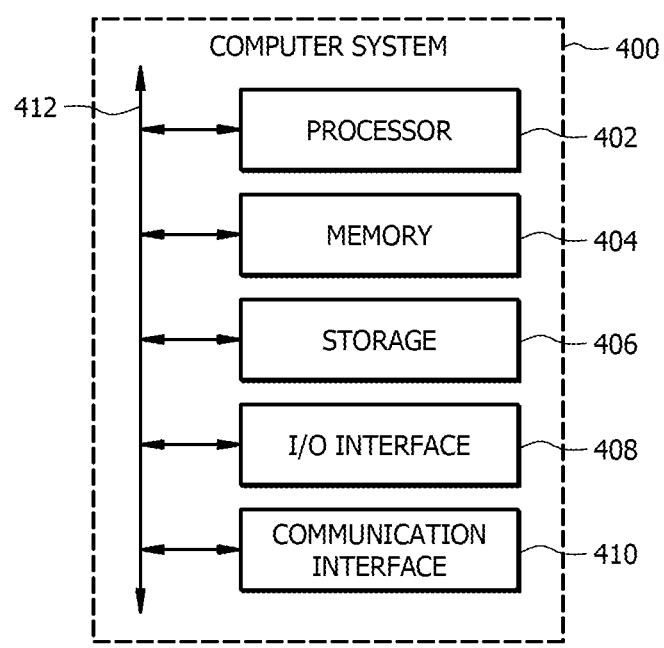
FIG. 4 illustrates an example computer system that may be used by the systems and methods described herein.

This disclosure includes systems and methods that support selection of NFs for broadband users and interoperability with the 5G cloud architecture platforms. Certain systems and methods of this disclosure use centralized BNG deployment and leverage 5G SBIs without interacting with enhanced packet data gateway (ePDG) and/or a non-3GPP interworking function (N3IWF). FIG. 1 shows an example system for integrating a BNG into a 5G network using SBIs, and FIG. 2 shows an example system for integrating a BNG into a 5G network using a N3IWF. FIG. 3 shows an example method for integrating a BNG into a network. FIG. 4 shows an example computer system that may be used by the systems and methods described herein.

FIG. 1 illustrates an example system 100 for integrating a BNG into a 5G network using SBIs. System 100 or portions thereof may be associated with an entity, which may include any entity, such as a business or company (e.g., a service provider) that integrates a BNG into a 5G network using SBIs. The components of system 100 may include any suitable combination of hardware, firmware, and software. For example, the components of system 100 may use one or more elements of the computer system of FIG. 4.

System 100 includes CPEs 110, Fiber to the home (FTTH) networks 120, an Internet Protocol (IP)/Multiprotocol Label Switching (MPLS) aggregation network 130, an IP/MPLS core network 140, a control plane data center 150, and a user plane data center 160. One or more networks (e.g., FTTH networks 120, IP/MPLS network 130, and IP/MPLS core network 140) of system 100 include any type of network that facilitates communication between components of system 100. One or more networks of system 100 may connect one or more components of system 100. This disclosure contemplates any suitable network. One or more portions of any network of system 100 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. One or more networks of system 100 may be a communications network, such as a private network, a public network, a connection through Internet, a mobile network, a WI-FI network, etc. One or more components of system 100 may communicate over one or more networks of system 100. One or more networks may include a core network (e.g., a 4G and/or 5G network), an access network, an edge network, an ISP network, an NSP network, an aggregation network, and the like. One or more networks of system 100 may implement SD-WAN technology. SD-WAN is a specific application of software defined networking technology applied to WAN connections (e.g., broadband Internet, 4G, 5G, Long Term Evolution (LTE), MPLS, etc.).

One or more networks of system 100 include one or more network nodes (e.g., aggregation routers 124 of FTTH networks 120, aggregation routers 134 of IP/MPLS aggregation network 130, and aggregation routers 144 of IP/MPLS core network 140). The network nodes of system 100 are connection points that can receive, create, store, and/or send data. The nodes of system 100 may be managed by an administrator (e.g., a service provider) of one or more networks. The nodes may include one or more endpoints and/or one or more redistribution points that recognize, process, and forward data to other nodes. In certain embodiments, the nodes of system 100 include data communications equipment such as switches, bridges, modems, hubs, and the like. In some embodiments, the nodes may include data terminal equipment such as routers, servers, printers, workstations, and the like. In certain embodiments, the nodes may include host computers, personal computers, smartphones, Internet of Things (IOT) devices, edge routers, and/or gateways.

CPE 110 of system 100 is any telecommunications hardware located at the home or business of a user (e.g., a subscriber). CPE 110 may be any terminal and associated equipment located at a subscriber's premises and connected with a carrier's telecommunication circuit. CPE 110 may allow users to access providers' communication services and distribute them in a residence or enterprise with a LAN. CPE 110 may include devices such as telephones, routers, network switches, residential gateways (RG), set-top boxes (STBs), personal computers (PCs), fixed mobile convergence products, home networking adapters, and Internet access gateways. In the illustrated embodiment of FIG. 1, each CPE 110 (i.e., CPE 110a, CPE 110b, CPE 110c, and CPE 110d) represents a triple play service in telecommunications that includes voice (phone), video (STB/TV), and data (PC). Individual devices of CPE 110 may connect to a home gateway (HG). In certain embodiments, the HG is a router that provides network access between LAN hosts to a larger network. The HG may provide network access via a modem. In the illustrated embodiment of FIG. 1, the HGs connect CPEs 110 to FTTH networks 120.

FTTH networks 120 (e.g., FTTH network 120a and FTTH network 120b) of system 100 are broadband networks that use optical fiber to provide high-speed Internet access. FTTP networks 120 may include fiber laid all the way to the premises/home/building of CPE 110 and/or fiber laid to a node with copper wires completing the connection. FTTH networks 120 may include one or more optical line terminals (OLTs) 122 and one or more aggregation routers 124. Each OLT 122 is a hardware device used in a passive optical network (PON) system. Each OLT 122 may convert standard signals used by a fiber optic service provider to the frequency and framing used by the PON system. Aggregation routers 124 (notated as AG1 in FIG. 1) are used to organize FTTH networks 120 by replacing multiple routes with a single, general route. Aggregation routers 124 limit the number of routers (and accompanying routes) available to service providers. OLTs 122 and aggregation routers 124 of FTTH networks 120 may be used to connect users (e.g., subscribers) associated with CPEs 110 to BNG router 154 of control plane data center 150. In the illustrated embodiment of FIG. 1, FTTH networks 120 connect CPEs 110 to IP/MPLS aggregation network 130.

IP/MPLS aggregation network 130 of system 100 is an integrated, packet-based network capable of supporting converged network services. IP/MPLS aggregation network 130 may utilize both IP and MPLS technology. MPLS is a routing technique that directs data from one node to the next based on short path labels rather than long network addresses. IP/MPLS aggregation network 130 includes multiple aggregation routers 134 (notated as AG2 in FIG. 1). Aggregation routers 134 are used to organize IP/MPLS aggregation network 130 by replacing multiple routes with a single, general route. Aggregation routers 134 limit the number of routers (and accompanying routes) available to service providers. In the illustrated embodiment of FIG. 1, aggregation routers 134 of IP/MPLS aggregation network 130 communicate network traffic to IP/MPLS core network 140.

IP/MPLS core network 140 of system 100 is an integrated core network that may utilize both IP and MPLS technology. IP/MPLS core network 140 acts as an anchor point for multi-access technologies. In the illustrated embodiment of FIG. 1, IP/MPLS core network 140 is a 5G network. IP/MPLS core network 140 may aggregate data traffic from end devices, authenticate subscribers and devices, apply personalized policies, and/or manage the mobility of the devices before routing the traffic to operator services or the Internet. IP/MPLS core network 140 includes multiple aggregation routers 144 (notated as AG3 in FIG. 1). Aggregation routers 144 are used to organize IP/MPLS core network 140 by replacing multiple routes with a single, general route. Aggregation routers 144 limit the number of routers (and accompanying routes) available to service providers. In the illustrated embodiment of FIG. 1, aggregation routers 144 of IP/MPLS core network 140 communicate network traffic to BNG router 154 of control plane data center 150. IP/MPLS core network 140 may be decomposed into a number of SBA elements. IP/MPLS core network 140 includes pure, virtualized, software-based NFs (or services) that are instantiated within multi-access edge computing (MEC) cloud infrastructures. The 5G NFs include an NSSF, an NRF, a Unified Data Management (UDM), a PCF, a CHF, and an AUSF.

The NSSF is a mobile core network function that allows the network to be segmented and managed for a specific use case or business scenario. The NSSF may be used to select the network slice instances that will serve a particular device. In certain embodiments, the NSSF determines the allowed NSSAI that is communicated to a device. A network slice includes the 5G NFs needed to serve an end-user.

The NRF is a mobile core network function that provides NF service registration and discovery and allows NFs to identify appropriate services in one another. For example, the NRF may be used to identify subscriptions of NF instances using BNG router 154 enhanced by access parameters (e.g., remote ID and circuit ID). The access parameters may be received by CPE 110. As another example, NRF may be used to perform service discovery of NF instances based on NF instance IDs and access parameters (e.g., remote ID and circuit ID).

A Unified Data Management (UDM) is a network function that provides services to other SBA functions. The UDM may provide authentication credentials while being employed by the Access and Mobility Management Function (AMF) and Session Management Function (SMF) to retrieve subscriber data and context. The UDM may retrieve subscription data and service support based on NF Instance ID, end-user parameters (e.g., a username or a media access control (MAC) address), and/or access parameters (e.g., a remote ID and a circuit ID).

A PCF is a network function that provides subscriber and access parameters as part of policy control. The PCF may be used to retrieve a policy enforcement profile from an end-user using end-user parameters (e.g., a username or MAC address) and/or access parameters (e.g., a remote ID and a circuit ID). The PCF may leverage BNG router 154 to provide hierarchical QoS based on the end-user and access parameters.

A CHF is a network function that introduces subscriber and access parameters for broadband users for billing purposes with various charging triggers. Online and/or offline charging are supported on the user subsection and may be location based. The CHF requires the modification of the N40 interface based on the access parameters (e.g., remote ID and circuit ID).

The AUSF is a network function that is used to manage subscriber authentication during registration or re-registration with 5G. The AUSF may obtain authentication vectors from the UDM. The AUSF may authorize and/or authenticate end-users using Password Authentication Protocol (PAP), Challenge-Handshake Authentication Protocol (CHAP), and/or Extensible Authentication Protocol and authentication parameters that are received as part of Point to Point Protocol over Ethernet (PPPoE), Internet Protocol over Ethernet (IPoE), and/or Dynamic Host Configuration Protocol (DHCP) packets from end-users. The AUSF leverages the access parameters (e.g., remote ID and circuit ID) to authorize and/or authenticate the user.

Control plane data center 150 of system 100 is responsible for maintaining sessions and exchanging protocol information with network devices. Control Plane/User Plane Separation (CUPS) is a capability that allows mobile operators to separate the control plane (e.g., control plane data center 150) and the user plane (e.g., user plane data center 160) of system 100. For example, control plane data center 150 may be centrally located (e.g., the middle of the United States), and user plane data center 160 may be located closer to an application (e.g., an application on CPE 110a) that it is supporting. Control plane data center 150 includes interfaces 152, a BNG router 154, an SMF router 155, a Packet Gateway (PGW) router 156, and a database 158. Database 158 of control plane data center 150 is an organized collection of data that maintains subscription information once a user is connected to a network (e.g., 4G, 5G, or fixed wireless access).

Interfaces 152 of control plane data center 150 are points of interconnection between two network elements of system 100. Interfaces 152 include SBIs 152*a* and LTE interfaces 152*b*. SBIs 152*a* are components of SBA that are used for interaction between NF services within 5G core networks. NFs may expose their functionality through SBIs 152*a*. SBIs 152*a* may support a request-response model or a subscribe-notify model of an NF service. For example, SBI 152*a* may be used to communicate a request from a first NF to a second NF and communicate a response from the second NF to the first NF. As another example, SBI 152*a* may be used to communicate a subscription from a first NF to a second NF and communicate a notification from the second NF to the first NF. Examples of SBIs 152*a* include N7, N10, N40, NRF, and AUSF interfaces. LTE interfaces 152*b* connect various components to or within a core network. LTE interfaces 152*b* include Gx, Gy, and Gz interfaces. The Gx interface may allow signaling of Policy Control and Charging (PCC) decisions. The Gy interface may serve as an online charging reference point. The Gz interface may serve as an offline charging reference point.

BNG router 154 of control plane data center 150 is a network node that supports BNG functionality. BNG router 154 may communicate with CPEs 110, store subscription and credentials of CPEs 110, allow access to external networks and services, provide security, manage the network access, manage network mobility, and the like. When a connection is established between BNG router 154 and CPE 110, the end-user (e.g., the subscriber) can access the broadband services provided by the NSP or ISP. In certain embodiments, BNG router 154 establishes and manages subscriber sessions. When a session is active, BNG router 154 aggregates traffic from various subscriber sessions from an access network (e.g., FTTH network 120) and routes the traffic to the network of the service provider. In certain embodiments, the BNG functionality of BNG router 154 is introduced as its own NF. The BNG NF may define a corresponding SBI 152*a* and use expose its functionality through the corresponding SBI 152*a*.

In certain embodiments, BNG router 154 is configured to act as a BNG. Configuring router 154 to act as a BNG may include one or more of the following steps: configuring BNG router 154 to interact with a Remote Authentication Dial-In User Service (RADIUS) server, activating one or more control policies to determine an action that BNG performs in response to specific events, establishing subscriber sessions, deploying QoS, configuring subscriber features, verifying session establishment, and disabling Select VPN Routing and Forwarding (VRF) download (SVD). BNG router 154 may be deployed by the service provider. In the illustrated embodiment of FIG. 1, BNG router 154 is centrally located in control plane data center 150.

SMF router 155 of control plane data center 150 is a router that supports SMF functionality. An SMF is a network function that is responsible for interacting with user plane data center 160. SMF router 155 may create, update, and/or and remove Protocol Data Unit (PDU) sessions and managing session context within User Plane Function (UPF) routers 164 of user plane data center 160. In certain embodiments, SMF router 155 acts as a DHCP node and IP Address Management (IPAM) system.

PGW-C router 156 of control plane data center 150 is a router that supports packet gateway control plane functions. PGW-C router 156 is responsible for handling signaling traffic. In certain embodiments, CUPS decouples PGW-C (control-plane) and PGW-U (user plane) functions to allow the data forwarding component (PGW-U) to be decentralized. As such, PGW-C router 156 remains centralized in control plane data center 150, whereas a PGW-U router may be located in user plane data center 160 that is located closer to the network edge.

User plane data center 160 of system 100 is responsible for the switching of packets through a router. User plane data center 160 includes UPF routers 164 (notated as AG1 in FIG. 1). UPF routers 164 of user plane data center 160 are network components that support UPF functionality. UPF is a 5G network function that acts as a forwarding engine for user traffic. In the illustrated embodiment of FIG. 1, UPF routers 164 are distributed and deployed independently from centralized control plane data center 150. UPF routers 164 may provide packet-based routing/forwarding, header manipulations, QoS, billing/charging, policy controls, and the like.

PWHE 172 of system 100 may be used to establish connection 170 from FTTH network 120*b* to BNG router 154 of control plane data center 150. Similarly, PWHE 182 of system 100 may be used to establish connection 180 from FTTH network 120*a* to BNG router 154 of control plane data center 150. PWHE is a technology that allows termination of access PWs into a Layer 3 (VRF or global) domain or into a Layer 2 domain. PWs facilitate tunneling customer traffic into a common IP/MPLS network infrastructure (e.g., IP/MPLS aggregation network 130 and IP/MPLS core network 140).

System 100 of FIG. 1 may integrate BNG router 154 into a 5G network by establishing PWHE 172 or 182 to expose end-user L2 connectivity from CPE 110 to BNG router 154 located in control plane data center 150. For example, an end-user may connect from CPE 110*a* to FTTH network 120*a* using OLT 122, and OLT 122 may establish a connection to aggregation router 124 of FTTH network 120*a*. PWHE 182 may be used to establish connection 180 from aggregation router 124 of FTTH network 120*a* to BNG router 154 of control plane data center 150. Specifically, PHWE 182 may be used to establish connection 180 from aggregation router 124 of FTTH network 120*a* to aggregation router 134 of IP/MPLS aggregation network 130, from aggregation router 134 of IP/MPLS aggregation network 130 to aggregation router 144 of IP/MPLS core network 140, and from aggregation router 144 of IP/MPLS core network 140 to BNG router 154 of control plane data center 150.

Similarly, an end-user may connect from CPE 110*d* to FTTH network 120*b* using OLT 122, and OLT 122 may establish a connection to aggregation router 124 of FTTH network 120*b*. PWHE 172 may be used to establish connection 170 from aggregation router 124 of FTTH network 120*b* to BNG router 154 of control plane data center 150. Specifically, PHWE 172 may be used to establish connection 170 from aggregation router 124 of FTTH network 120*b* to aggregation router 134 of IP/MPLS aggregation network 130, from aggregation router 134 of IP/MPLS aggregation network 130 to aggregation router 144 of IP/MPLS core network 140, and from aggregation router 144 of IP/MPLS core network 140 to BNG router 154 of control plane data center 150.

PPPoE is a type of broadband connection that provides authentication (e.g., username and password) in addition to data transport. IPoE is a method of delivering an IP payload over an Ethernet-based access network or an access network using bridged Ethernet over Asynchronous Transfer Mode (ATM) without using PPPoE. Each subscriber (e.g., an application running on CPE 110) connects to one or more networks (e.g., FTTH network 120) of system 100 by a logical session. A PPPoE subscriber session may be established using the PPP protocol that runs between CPE 110 and BNG router 154. An IPoE subscriber session may be established using IP protocol that runs between CPE 110 and BNG router 154.

IP addressing may be performed using a DHCP. DHCP is used to assign customer premise host IP addresses in a LAN environment. A relay agent information option may be inserted by the DHCP relay agent when forwarding client-originated DHCP packets to a DHCP node (e.g., SMF router 155). Nodes recognizing the relay agent information option may use the information to implement IP address or other parameter assignment policies. The relay agent information option is organized as a single DHCP option that includes one or more sub-options that convey information known by the relay agent. The initial sub-options are defined for a relay agent that is co-located in a public circuit access unit. These include a "circuit ID" that identifies the incoming circuit and a "remote ID" that identifies the remote host end (e.g., a high-speed modem) of the circuit. The relay agent (e.g., a DHCPv4/v6 relay agent) or an access-aggregation device may be used to discover the remote ID. For example, the relay agent or the access-aggregation device may snoop the DHCPv4/v6 or PPPoE packets to append the packets with the remote ID and/or the circuit ID prior to relaying them to the DHCP node. The remote ID and/or the circuit ID may be represented as a decimal value, a string value, or a hostname.

System 100 may leverage end-user parameters for authorization and/or authentication. End-user parameters are used to identify the end-user. For PPPoE, the identification of the end-user is a username. For IPoE, the identification of the end-user is a MAC address. System 100 may leverage access parameters to determine how to slice the NFs. For example, broadband deployments may leverage the remote ID and the circuit ID of the access network to provide a selection of one or more of the following parameters: access, QoS, policy enforcement, prepaid online charging, offline charging, etc.

System 100 may leverage authentication parameters to determine how to slice the NFs. Authentication parameters include credentials of the end-users. For PPPoE broadband users, the authentication protocols that carry the username and password are the PAP and the CHAP. For IPoE broadband users, DHCPv4 and DHCPv6 carry authentication parameters for various protocols (e.g., PAP, CHAP, Extensible Authentication Protocol (EAP), etc.). For fixed-wireless users, DHCPv4 and DHCPv6 carry authentication parameters for various protocols (e.g., EAP).

In operation, BNG router 154 of control plane data center 150 is configured to act as a BNG. BNG router 154 establishes connection 180 between CPE 110a and the BNG. Connection 180 of system 100 is established through aggregation routers 124 of FTTH network 120a, aggregation routers 134 of IP/MPLS aggregation network 130, and aggregation routers 144 of IP/MPLS core network 140. PWHE 182 is used to expose end-user L2 connectivity to BNG router 154. BNG router 154 receives end-user parameters (e.g., a username, a MAC address, etc.) from CPE 110 and access parameters (e.g., a remote ID and a circuit ID) from access FTTH network 120a. BNG router 154 introduces the end-user and access parameters to one or more 5G NFs by interacting with one or more SBIs 152a. The 5G NFs may include NSSF, NRF, PCF, CHF, AUSF, and the like. BNG router 154 provides CPE 110a access to the one or more 5G NFs in response to communicating the end-user and access parameters to the one or more 5G NFs. As such, system 100 provides end-users access to 5G NFs while maintaining interoperability with the 5G architecture.

Although FIG. 1 illustrates a particular arrangement of CPEs 110, FTTH networks 120, IP/MPLS aggregation network 130, IP/MPLS core network 140, control plane data center 150, and user plane data center 160, this disclosure contemplates any suitable arrangement of CPEs 110, FTTH networks 120, IP/MPLS aggregation network 130, IP/MPLS core network 140, control plane data center 150, and user plane data center 160. Although FIG. 1 illustrates a particular number of CPEs 110, FTTH networks 120, IP/MPLS aggregation networks 130, IP/MPLS core networks 140, control plane data centers 150, and user plane data centers 160, this disclosure contemplates any suitable number of CPEs 110, FTTH networks 120, IP/MPLS aggregation networks 130, IP/MPLS core networks 140, control plane data centers 150, and user plane data centers 160. For example, system 100 may include more than one BNG router 154.

FIG. 2 illustrates an example system 200 for integrating a BNG into a 5G network using an N3IWF. System 200 or portions thereof may be associated with an entity, which may include any entity, such as a business or company (e.g., a service provider) that integrates the BNG into a 5G network using the N3IWF. The components of system 200 may include any suitable combination of hardware, firmware, and software. For example, the components of system 200 may use one or more elements of the computer system of FIG. 4.

System 200 includes CPE 210, a digital subscriber line access multiplexer (DSLAM) 220, an aggregate network 230, a BNG-CP 240, an N3IWF 250, a UPF 252, a data network (DN) 254, a BNG-UP 260, a UPF 262, a local DN 264, an SMF/PGW-C 270, and interfaces 280. One or more networks of system 200 include any type of network that facilitates communication between components of system 200.

CPE 210 of system 200 is any telecommunications hardware located at the home or business of a user (e.g., a subscriber). CPE 210 may be any terminal and associated equipment located at a subscriber's premises and connected with a carrier's telecommunication circuit. CPE 210 may allow users to access providers' communication services and distribute them in a residence or enterprise with a LAN. CPE 210 may include devices such as telephones, routers, network switches, RGs, STBs, PCs, fixed mobile convergence products, home networking adapters, and Internet access gateways. In the illustrated embodiment of FIG. 2, CPE 210 represents a triple play service in telecommunications that includes voice (phone), video (STB/TV), and data (PC). Individual devices of CPE 210 may connect to HG. In certain embodiments, HG is a router that provides network access between LAN hosts to a larger network. HG may provide network access via a modem. In the illustrated embodiment of FIG. 2, HG connects CPE 210 to DSLAM 220.

DSLAM 220 is a network device that receives signals from multiple customer Digital Subscriber Line (DSL) connections and puts the signals on a high-speed backbone line using multiplexing techniques. In certain embodiments, multiple HGs may connect to a single DSLAM 220. DSLAM 220 sends traffic received from CPE 210 to aggregation network 230. Aggregation network 230 is located between DSLAM 220 and BNG-CP 240. Aggregation network 230 communicates the traffic received from CPE 210 to BNG-CP 240.

BNG-CP 240 is a network component located in a control plane that provides BNG functionality. As illustrated in FIG. 2, BNG-CP 240 is located between aggregation network 230 and N3IWF 250. BNG-CP 240 interacts with N3IWF 250 over a secure channel communication (e.g., an IPSec tunnel). BNG-CP 240 may communicate end-user parameters (e.g., username or MAC address), access parameters (e.g., remote ID and circuit ID), and/or authentication parameters to N3IWF 250 using Internet Key Exchange version 2 (IKEv2) Protocol.

N3IWF 250 is an IPSec gateway that is used for integrating non-3GPP access types into the 5G standalone (SA) core. N3IWF 250 may be used for non-3GPP access types such as WI-FI and fixed-line integration into the 5G SA core. N3IWF 250 terminates the IKEv2 and IPSec protocols with the user equipment and relays over the N3 interface the information needed to authenticate the user equipment and authorize its access to the 5G core network. N3IWF 250 communicates, via interface N3, with UPF 252. UPF 252 is a network component that supports UPF functionality. UPF 252 provides a forwarding engine for user traffic. UPF 252 communicates with DN 254 over interface N6. DN 254 may provide operator services, Internet access, and/or third party services.

N3IWF 250 communicates with SMF/PGW-C 270 over interface S2B. SMF/PGW-C 270 is a network component that provides SMF and/or PGW functionality. The SMF is responsible for session management with individual functions being supported on a per session basis. The SMF may allocate IP addresses to user equipment and select and control the UPF (e.g., UPF 252 or UPF 62) for data transfer. SMF/PGW-C 270 may act as the external point for all communication related to the various services offered and enabled in the user plane and how the policy and charging treatment for these services is applied. S2B interface is a reference point that connects N3IWF 250 and SMF/PGW-C 270. SMF/PGW-C 270 may utilize interfaces 280 (e.g., SBIs 280*a* and LTE interfaces 280*b*). For example, SMF/PGW-C 270 may use SBIs 280*a* to expose the functionality of the NFs.

Sending all traffic received by BNG-CP 240 to N3IWF 250 over the IPSec tunnel may slow down the traffic due to encryption/decryption. In certain embodiments, traffic may be offloaded from BNG-CP 240 such that the traffic is not sent to N3IWF 250 over the IPSec tunnel. For example, the traffic may be offloaded to BNG-UP 260. BNG-CP 240 may program flows to local DN 264 directly on BNG-UP 260 using N3IWF 250. BNG-UP 260 is a network component located in a user plane that provides BNG functionality. BNG-UP 260 includes a UPF branching point to UPF 262. BNG-UP 260 communicates with BNG-CP 250 and SMF/PGW-C 270 using PFCP. BNG-UP 260 supports an N4 interface, which can be controlled by SMF. BNG-UP 260 communicates with UPF 262 using interface N9, and UPF 262 communicates with local DN 264 using interface N6. Local DN 264 is a DN that is accessible by CPE 210 only in specific locations. Local DN 264 may provide operator services, Internet access, and/or third party services.

In certain embodiments, one or more of the following 5G NFs are modified based on end-user parameters (e.g., a username or a MAC address) received from CPE 210 and access parameters (e.g., a remote ID and a circuit ID) received from aggregation network 230: NSSF, NRF, PCF, CHF, and AUSF. For example, CPE 210 may communicate the end-user parameters to SBIs 280*a* using DSLAM 220, BNG-CP 240, N3IWF 250, and SMG/PGW-C 270, and access aggregation network 230 may communicate access parameters to SBIs 280*a* using BNG-CP 240, N3IWF 250, and SMG/PGW-C 270. SBIs 280*a* may then expose the functionality of one or more 5G NFs using the end-user parameters and the access parameters. In some embodiments, the BNG functionality of BNG-CP 240 is introduced as its own NF. The BNG NF may define a corresponding SBI 180*a* and use expose its functionality through the corresponding SBI 180*a*.

Although FIG. 2 illustrates a particular arrangement of CPE 210, DSLAM 220, aggregate network 230, BNG-CP 240, N3IWF 250, UPF 252, DN 254, BNG-UP 260, UPF 262, local DN 264, SMF/PGW-C 270, and interfaces 280, this disclosure contemplates any suitable arrangement of CPE 210, DSLAM 220, aggregate network 230, BNG-CP 240, N3IWF 250, UPF 252, DN 254, BNG-UP 260, UPF 262, local DN 264, SMF/PGW-C 270, and interfaces 280. Although FIG. 1 illustrates a particular number of CPEs 210, DSLAMs 210, aggregate networks 230, BNG-CPs 240, N3IWFs 250, UPFs 252, DNs 254, BNG-UPs 260, UPFs 262, local DNs 264, SMF/PGW-Cs 270, and interfaces 280, this disclosure contemplates any suitable number of CPEs 210, DSLAMs 210, aggregate networks 230, BNG-CPs 240, N3IWFs 250, UPFs 252, DNs 254, BNG-UPs 260, UPFs 262, local DNs 264, SMF/PGW-Cs 270, and interfaces 280.

FIG. 3 illustrates an example method 300 for integrating a BNG into a 5G network. Method 300 begins at step 310. At step 320, a router is configured to act as a BNG. For example, BNG router 154 of FIG. 1, which is centrally located in control plane data center 150, may be configured to act as a BNG. As another example, BNG-CP 240 of FIG. 2, which is located in a control plane between aggregation network 230 and N3IWF 250, may be configured to act as a BNG. Method 300 then moves from step 320 to step 330.

At step 330 of method 300, the BNG router establishes a connection between CPE and BNG using 5G network SBIs. For example, BNG router 154 of FIG. 1 may use SBIs 152*a* to establish connection 170 between CPE 110*d* and BNG router 154 through FTTH network 120*b*, IP/MPLS aggregation network 130, and IP/MPLS core network 140, and PWHE 172 may be used to expose end-user L2 connectivity to BNG router 154. As another example, BNG router 154 of FIG. 1 may use SBIs 152*a* to establish connection 180 between CPE 110*a* and BNG router 154 through FTTH network 120*a*, IP/MPLS aggregation network 130, and IP/MPLS core network 140, and PWHE 182 may be used to expose end-user Layer 2 (L2) connectivity to BNG router 154. As still another example, BNG-CP 240 of FIG. 2 may use SBIs 280*a* to establish a connection between CPE 210 and BNG-CP 240 through DSLAM 220 and aggregation network 230. Method 300 then moves from step 330 to step 340.

At step 340 of method 300, the BNG router receives end-user parameters (e.g., a username, a MAC address, etc.) and access parameters (e.g., a remote ID and a circuit ID). For example, BNG router 154 of FIG. 1 may receive end-user parameters (e.g., a username, a MAC address, etc.) associated with CPE 110*a* and access parameters (e.g., a remote ID and a circuit ID) associated with connection 180. As another example, BNG-CP 240 of FIG. 2 may receive end-user parameters (e.g., a username, a MAC address, etc.) associated with CPE 210 and access parameters (e.g., a remote ID and a circuit ID) associated with the connection between CPE 210 and BNG-CP 240. Method 300 then moves from step 340 to step 350.

At step 350, method 300 determines whether the BNG router is centrally located within a control plane data center. For example, method 300 may determine that the BNG router is centrally located within a control plane data center as illustrated in FIG. 1. If the BNG router is centrally located within the control plane data center, method 300 moves from step 350 to step 360, where the BNG router introduces the end-user and access parameters to one or more 5G NFs by interacting with one or more SBIs. For example, BNG router 154 of FIG. 1 may introduce the end-user and access parameters to one or more 5G NFs by interacting with one or more SBIs 152a. The 5G NFs may include NSSF, NRF, PCF, CHF, AUSF, and the like. If the BNG router is not centrally located within the control plane data center, method 300 moves from step 350 to step 370, where the BNG router introduces the end-user and access parameters to one or more 5G NFs using an N3IWF. For example, BNG-CP 240 of FIG. 2 may communicate the end-user and access parameters to N3IWF 250 using an IKEv2 Protocol so that N3IWF 250 can introduce the end-user and access parameters to one or more 5G NFs using SBIs 280a. Method 300 then moves from steps 360 and 370 to step 380.

At step 380 of method 300, the BNG router provides CPE access to the one or more 5G NFs. For example, BNG router 154 of FIG. 1 may provide CPE 110a access to the one or more 5G NFs in response to communicating the end-user and access parameters to the one or more 5G NFs using SBIs 152a. As another example, BNG-CP 240 of FIG. 2 may provide CPE 210 access to the one or more 5G NFs in response to communicating the end-user and access parameters to the one or more 5G NFs using N3IWF 250. Method 300 then moves from step 380 to step 390, where method 300 ends. As such, method 300 provides end-users access to 5G NFs while maintaining interoperability with the 5G architecture.

Although this disclosure describes and illustrates an example method 300 for integrating a BNG into a 5G network including the particular steps of the method of FIG. 3, this disclosure contemplates any suitable method 300 for integrating the BNG into a 5G network, including any suitable steps, which may include all, some, or none of the steps of the method of FIG. 3, where appropriate. Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, allowing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both allowing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a LTE network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A network component, comprising:
   one or more processors; and
   one or more computer-readable non-transitory storage media coupled to the one or more processors and comprising instructions that, when executed by the one or more processors, cause the network component to perform operations comprising:
   configuring the network component to act as a Broadband Network Gateway (BNG);
   establishing a connection between customer premise equipment (CPE) and the BNG;
   receiving end-user parameters and access parameters;
   communicating the end-user parameters and the access parameters to one or more 5G Network Functions (NFs) by interacting with one or more service-based interfaces (SBIs); and
   allowing the CPE access to the one or more 5G NFs in response to communicating the end-user parameters and the access parameters to the one or more 5G NFs;
   wherein:
     the network component is located between a digital subscriber line access multiplexer (DSLAM) and a Non-3GPP Interworking Function (N3IWF);
     the network component communicates with the N3IWF via an Internet Protocol Security (IPSec) tunnel; and
     the network component interacts with the one or more SBIs via the N3IWF.

2. The network component of claim 1, wherein the one or more 5G NFs comprise one or more of the following NFs:
   a Network Slice Selection Function (NSSF);
   a Network Repository Function (NRF);
   a Policy Control Function (PCF);
   a Charging Function (CHF); and
   an Authentication Server Function (AUSF).

3. The network component of claim 1, wherein:
   the end-user parameters comprise end-user identifications; and
   the access parameters comprise at least one of remote IDs and circuit IDs.

4. The network component of claim 1, wherein the network component is located in a control plane.

5. The network component of claim 1, wherein the network component is further located between the DSLAM and a BNG-user plane (BNG-UP) network component.

6. The network component of claim 5, the operations further comprising communicating with the BNG-UP network component using a packet forwarding control protocol (PFCP).

7. The network component of claim 5, the operations further comprising programming flows to a local data network directly on the BNG-UP network component.

8. A method, comprising:
   configuring a network component to act as a Broadband Network Gateway (BNG);
   establishing a connection between customer premise equipment (CPE) and the BNG;

receiving end-user parameters and access parameters;

communicating the end-user parameters and the access parameters to one or more 5G Network Functions (NFs) by interacting with one or more service-based interfaces (SBIs); and allowing the CPE access to the one or more 5G NFs in response to communicating the end-user parameters and the access parameters to the one or more 5G NFs;

wherein:

the network component is located between a digital subscriber line access multiplexer (DSLAM) and a Non-3GPP Interworking Function (N3IWF);

the network component communicates with the N3IWF via an Internet Protocol Security (IPSec) tunnel; and the network component interacts with the one or more SBIs via the N3IWF.

9. The method of claim 8, wherein the one or more 5G NFs comprise one or more of the following NFs:
a Network Slice Selection Function (NSSF);
a Network Repository Function (NRF);
a Policy Control Function (PCF);
a Charging Function (CHF); and
an Authentication Server Function (AUSF).

10. The method of claim 8, wherein:
the end-user parameters comprise end-user identifications; and
the access parameters comprise at least one of remote IDs and circuit IDs.

11. The method of claim 8, wherein the network component is located in a control plane.

12. The method of claim 8, wherein the network component is further located between the DSLAM and a BNG-user plane (BNG-UP) network component.

13. The method of claim 12, further comprising communicating with the BNG-UP network component using a packet forwarding control protocol (PFCP).

14. The method of claim 12, further comprising programming flows to a local data network directly on the BNG-UP network component.

15. One or more computer-readable non-transitory storage media embodying instructions that, when executed by a processor, cause the processor to perform operations comprising:

configuring a network component to act as a Broadband Network Gateway (BNG);

establishing a connection between customer premise equipment (CPE) and the BNG;

receiving end-user parameters and access parameters;

communicating the end-user parameters and the access parameters to one or more 5G Network Functions (NFs) by interacting with one or more service-based interfaces (SBIs); and allowing the CPE access to the one or more 5G NFs in response to communicating the end-user parameters and the access parameters to the one or more 5G NFs;

wherein:

the network component is located between a digital subscriber line access multiplexer (DSLAM) and a Non-3GPP Interworking Function (N3IWF);

the network component communicates with the N3IWF via an Internet Protocol Security (IPSec) tunnel; and the network component interacts with the one or more SBIs via the N3IWF.

16. The one or more computer-readable non-transitory storage media of claim 15, wherein the one or more 5G NFs comprise one or more of the following NFs:
a Network Slice Selection Function (NSSF);
a Network Repository Function (NRF);
a Policy Control Function (PCF);
a Charging Function (CHF); and
an Authentication Server Function (AUSF).

17. The one or more computer-readable non-transitory storage media of claim 15, wherein:
the end-user parameters comprise end-user identifications; and
the access parameters comprise at least one of remote IDs and circuit IDs.

18. The one or more computer-readable non-transitory storage media of claim 15, wherein the network component is located in a control plane.

19. The one or more computer-readable non-transitory storage media of claim 15, wherein the network component is further located between the DSLAM and a BNG-user plane (BNG-UP) network component.

20. The one or more computer-readable non-transitory storage media of claim 19, the operations further comprising communicating with the BNG-UP network component using a packet forwarding control protocol (PFCP).

* * * * *